(No Model.)
J. F. HEALEY.
PEARL BUTTON TURNING LATHE.
No. 549,915. Patented Nov. 19, 1895.
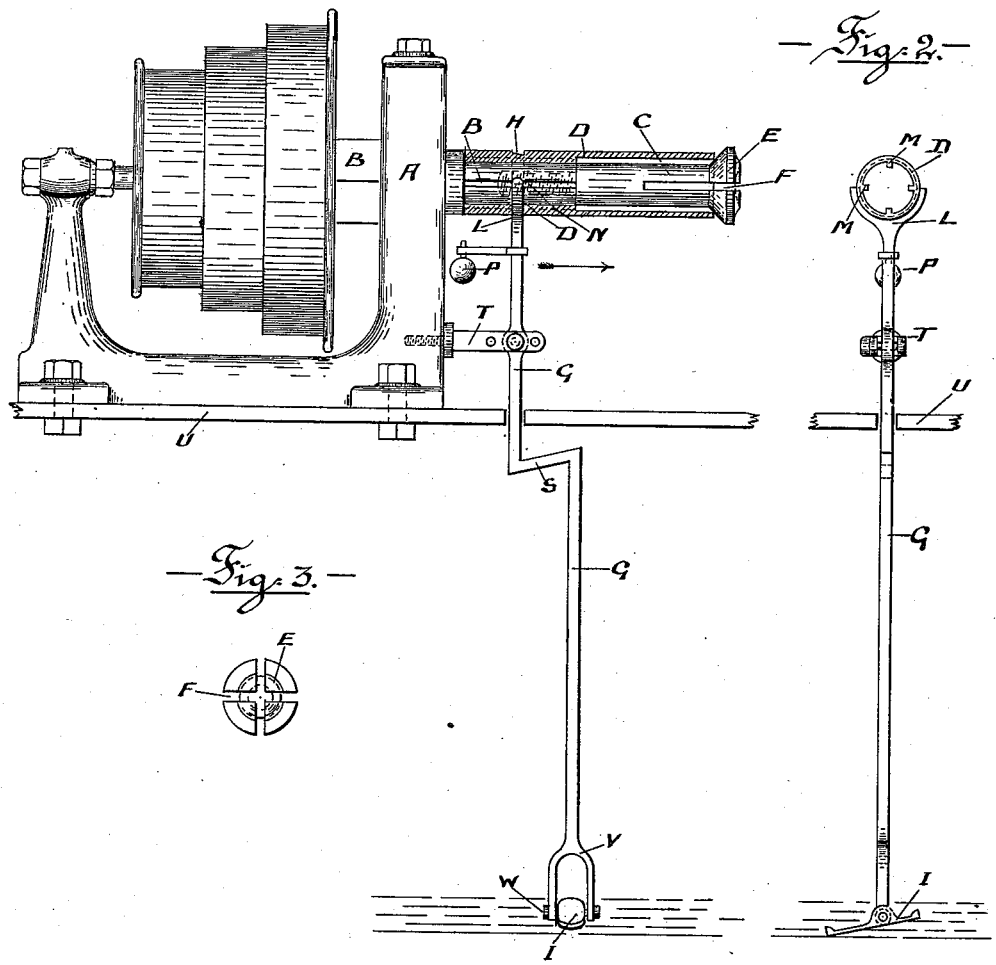

UNITED STATES PATENT OFFICE.

JOHN F. HEALEY, OF NEWARK, NEW JERSEY.

PEARL-BUTTON TURNING-LATHE.

SPECIFICATION forming part of Letters Patent No. 549,915, dated November 19, 1895.

Application filed March 27, 1894. Serial No. 505,331. (No model.)

*To all whom it may concern:*

Be it known that I, JOHN F. HEALEY, a citizen of the United States, residing at Newark, in the county of Essex and State of New Jersey, have invented certain new and useful Improvements in Pearl-Button Turning-Lathes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to secure a means of retaining your hold on the button during the process of turning or polishing by means of your foot, thus leaving your hands free.

Figure 1 is a side elevation showing the front bearing of a pearl-button turning-lathe and its spindle with my improvement attached thereunto extending downward through working-bench and ending in a foot-treadle. Fig. 2 is a front view of Fig. 1, showing only the bush and treadle improvement. Fig. 3 is a front view of button holder or chuck, showing the slits at right angles with each other that hold the buttons.

In Fig. 1 A indicates the front part and front bearing of a pearl-button turning-lathe. B is the spindle proper, resting in bearing A and containing chuck C, in which the buttons are held fast while under process of turning.

D indicates a bush which lies around both spindle B and chuck C, resting against both. This was formerly short and out of contact with spindle B—*i. e.*, when lathe was running and spindle and chuck consequently revolving D was caught by the left hand of the turner and pressed tight against the head E of chuck C, thus closing the slits or jaws F on the button. With my foot-treadle lever G I now propose by means of a conical indenture in bush D to force bush D by power of foot, treading on treadle I toward chuck-head E, thus closing jaws F around button and accomplishing the same object that was formerly done by hand.

The construction and adjustment of treadle G is the following: The upper part L is, as will be readily seen in Fig. 2, fork-shaped semicircularly and rests in the conical rill H of bush D, which is by the means of teeth M, fitting into grooves N, in solid contact with spindle B, and consequently revolves with it, and which will when in use, through the instrumentality of a leverage created by a knee S and being pivoted between the forks of an arm T be, when the foot is applied in treadle I, forced in the direction of arrow, and consequently bear against rill H, forcing bush D toward chuck-head E, closing jaws F and holding button, which is the desired object. When the foot is removed from treadle I, the pressure of treadle-lever G consequently ceases, and in order to make sure as to this point a weight P, attached to G, will counterbalance any friction that might possibly continue to close jaws on button, and will furthermore insure immediate release, my device thus combining the two salient points, instantaneous grip and instantaneous release of button. U represents working-bench on which lathe A is bolted down and is cut through to admit of treadle G being passed through. The lower part of treadle G is forked to admit foot-treadle I, working in fork V on pivot W.

What I claim as new, and desire to secure by Letters Patent, is—

In a pearl button turning lathe, a loose bush having a rill, said bush lying around and acting on a cone-shaped surface of the clutch or chuck; in combination with a foot-treadle lever, pivoted in a bearing attached to the lathe head, a counter-weight attached above said bearing, said lever having an upper semi-circular fork fitting in said rill and a foot-treadle pivoted in its lower, fork-shaped end in the manner and for the purposes as set forth.

In testimony that I claim the foregoing I have hereunto set my hand this 24th day of March, 1894.

JOHN F. HEALEY.

Witnesses:
AUGUST M. TRESCHOW,
AXUL V. BEEKEN.